United States Patent
West et al.

(10) Patent No.: US 9,969,253 B2
(45) Date of Patent: May 15, 2018

(54) HYBRID VEHICLE

(71) Applicant: VOLVO TRUCK CORPORATION, Göteborg (SE)

(72) Inventors: Martin West, Göteborg (SE); Richard Sebestyen, Torslanda (SE); John Simonsson, Göteborg (SE); Jonas Storm, Olofstorp (SE)

(73) Assignee: Volvo Truck Corporation, Göteborg (SE)

( * ) Notice: Subject to any disclaimer, the term of this patent is extended or adjusted under 35 U.S.C. 154(b) by 155 days.

(21) Appl. No.: 14/906,920

(22) PCT Filed: Aug. 5, 2014

(86) PCT No.: PCT/SE2014/000104
§ 371 (c)(1),
(2) Date: Jan. 22, 2016

(87) PCT Pub. No.: WO2015/020579
PCT Pub. Date: Feb. 12, 2015

(65) Prior Publication Data
US 2016/0152129 A1 Jun. 2, 2016

Related U.S. Application Data

(60) Provisional application No. 61/862,545, filed on Aug. 6, 2013.

(51) Int. Cl.
*B60L 1/10* (2006.01)
*B60L 3/00* (2006.01)
(Continued)

(52) U.S. Cl.
CPC ............. *B60K 6/22* (2013.01); *B60K 6/20* (2013.01); *B60K 6/28* (2013.01); *B60L 5/36* (2013.01);
(Continued)

(58) Field of Classification Search
CPC ... B60R 16/03; B60R 16/0315; B60R 21/017; Y02T 10/7005; H02J 7/1438
(Continued)

(56) References Cited

U.S. PATENT DOCUMENTS 5,722,502 A 3/1998 Kubo
2010/0065349 A1 3/2010 Ichikawa et al.
(Continued)

FOREIGN PATENT DOCUMENTS

CN 1993244 A 7/2007
CN 201597469 U 10/2010
(Continued)

OTHER PUBLICATIONS

European Search Report (dated Dec. 20, 2016) for corresponding European App. EP 14 83 4222.
(Continued)

*Primary Examiner* — Quan Tra
(74) *Attorney, Agent, or Firm* — WRB-IP LLP

(57) ABSTRACT

A hybrid energy system is provided in a vehicle including an autonomous power supply and being connectable to an external power supply infrastructure along the route of the vehicle, and which vehicle is arranged to operate in an autonomous power supply mode and/or in an external power supply mode. The system includes a first high voltage circuit including a first traction motor connected to an energy storage system by a first power converter for propelling the vehicle; a second high voltage circuit including a second traction motor connectable to an external power supply by a second power converter for propelling the vehicle; and where the first high voltage circuit and the second high voltage circuit are connectable by a third power converter between the first and the second power converters. A method for operating the hybrid energy system is also provided.

19 Claims, 9 Drawing Sheets

(51) Int. Cl.

| | | |
|---|---|---|
| *B60K 6/22* | (2007.10) | |
| *B60K 6/20* | (2007.10) | |
| *B60L 5/36* | (2006.01) | |
| *B60K 6/28* | (2007.10) | |
| *B60L 7/14* | (2006.01) | |
| *B60L 11/00* | (2006.01) | |
| *B60L 11/12* | (2006.01) | |
| *B60L 11/14* | (2006.01) | |
| *B60L 11/16* | (2006.01) | |
| *B60L 11/18* | (2006.01) | |
| *B60L 15/20* | (2006.01) | |

(52) U.S. Cl.
CPC ............... *B60L 7/14* (2013.01); *B60L 11/005* (2013.01); *B60L 11/123* (2013.01); *B60L 11/14* (2013.01); *B60L 11/16* (2013.01); *B60L 11/1811* (2013.01); *B60L 11/1861* (2013.01); *B60L 15/20* (2013.01); *B60L 2200/36* (2013.01); *B60L 2210/10* (2013.01); *B60L 2210/30* (2013.01); *B60L 2210/40* (2013.01); *B60L 2220/12* (2013.01); *B60L 2220/14* (2013.01); *B60L 2240/421* (2013.01); *B60L 2240/423* (2013.01); *B60L 2240/622* (2013.01); *B60L 2260/28* (2013.01); *B60Y 2200/92* (2013.01); *B60Y 2300/182* (2013.01); *B60Y 2400/21* (2013.01); *B60Y 2400/212* (2013.01); *B60Y 2410/115* (2013.01); *Y02T 10/6217* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 90/16* (2013.01); *Y02T 90/162* (2013.01); *Y10S 903/904* (2013.01)

(58) Field of Classification Search
USPC .......................................................... 307/10.1
See application file for complete search history.

(56) References Cited

U.S. PATENT DOCUMENTS

| | | | |
|---|---|---|---|
| 2010/0194318 A1* | 8/2010 | Aso ............................ | H02J 7/34 318/400.3 |
| 2010/0222953 A1* | 9/2010 | Tang .................... | B60L 15/2036 701/22 |
| 2010/0300780 A1* | 12/2010 | Caruso ..................... | B60K 6/46 180/65.21 |
| 2011/0094841 A1 | 4/2011 | Mazumdar et al. | |
| 2011/0106349 A1 | 5/2011 | Sakita | |
| 2013/0025992 A1 | 1/2013 | Asplund | |
| 2013/0140121 A1 | 6/2013 | Huber et al. | |
| 2013/0218386 A1* | 8/2013 | Fisker ....................... | B60K 6/46 701/22 |
| 2015/0202978 A1* | 7/2015 | Hatanaka .................. | B60L 1/00 701/19 |

FOREIGN PATENT DOCUMENTS

| | | |
|---|---|---|
| CN | 102066762 A | 5/2011 |
| EP | 2117106 A1 | 11/2009 |
| EP | 2295279 A1 | 3/2011 |
| WO | 9304887 A1 | 3/1993 |
| WO | 2012112704 A2 | 8/2012 |

OTHER PUBLICATIONS

Intenrational Search Report (dated Dec. 1, 2014) for corresponding International App. PCT/SE2014/000104.
Chinese Official Action (Sep. 8, 2017) for corresponding Chinese App. 201480044736.8.

* cited by examiner

HYBRID VEHICLE

BACKGROUND AND SUMMARY

The invention relates to a hybrid energy system for vehicles, which hybrid energy system comprises an autonomous power supply and is connectable to an external power supply infrastructure along the route of said vehicle, and a method for operating the system.

In recent years, development and commercialization of electric and hybrid vehicles that are effective in reducing fuel consumption and exhaust gases such as CO2 have been pursued. Electric vehicles for commercial use have a limited range because there are limits to the size and capacity of batteries mounted in the vehicles.

For hybrid vehicles provided with an internal combustion engine, or ICE, combined with an electric motor, the supply of electric energy is also dependent on a battery mounted in the vehicle. Consequently the cruising range of such a vehicle in electric mode is limited because of the limitations on the size and capacity of batteries mounted in the vehicle. Hybrid vehicles must therefore use an engine and a motor in combination to secure a long cruising range.

On the other hand, the cruising ranges of rail bound vehicles using electric energy are not limited because they run on electrical power received from overhead wires or an electric rail adjacent the track. For such vehicles it is necessary to lay tracks and manage them, which requires high construction cost and high maintenance cost. Hence, they are not suitable for transportation of goods between arbitrary locations Also, when there is an obstacle on a track or if a power outage occurs, the vehicle will be delayed until the problem has been eliminated.

A solution to the above problems are vehicles running on electrical power received from overhead wires such as "trolley buses" which were in common use in many cities in the past. In the subsequent text such vehicles will be referred to as power-collecting electric vehicles. Although no tracks are needed for such vehicles, they do need overhead wires, and they cannot run on roads unequipped with overhead wires, due to limited battery capacity. Hence, they do not have flexibility of general commercial vehicles.

Technology has since been developed to enable such power-collecting electric vehicles to run on roads not equipped with overhead wires. Such vehicles are equipped with a motor for propulsion, driven by electrical power received from overhead wires, as well as an internal combustion engine for generating electrical power to run the drive motor, for supplying mechanical power directly to a drive unit of the vehicle, or for charging on-board batteries. Such vehicles have been developed by applying hybrid technology to the power-collecting electric vehicle. Such hybrid vehicles have been developed by, for instance, Siemens AG for an "e-Highway" concept within the framework of the EU Seventh Framework Programme.

One problem with hybrid power-collecting electric vehicles is that the vehicles comprise an electric circuit with components that operate at different voltages. The circuit comprises a high voltage power-collecting system, connectable to overhead wires, and a hybrid electric system, comprising power electronic components and, optionally, a high voltage battery. Such arrangements require the use of a power converter that allows the high voltage from the overhead lines to be utilized by the vehicle. The power converter is usually a DC/DC converter, which can handle relatively high voltage, e.g. 500-700 V in the overhead wires. According to one example, the hybrid vehicle can comprise a high voltage power-collecting system and a power converter connected to one or more electric motors in a hybrid propulsion system comprising an ICE connectable to an electric motor. For a hybrid vehicle not provided with a storage battery, the power converter must be dimensioned for a continuous rating equal to the peak power requirement of the propulsion system, that is, at least 200-300 kW. Such an arrangement would be used for a vehicle mainly operated using the ICE.

According to a further example, the hybrid vehicle can comprise a high voltage power-collecting system and a power converter connected to a storage battery and one or more electric motors in a hybrid propulsion system comprising an ICE connectable to an electric motor. For a hybrid vehicle provided with a storage battery, the power converter can be dimensioned for a continuous rating equal to the average power requirement of the propulsion system, that is, at least 100-150 kW. Such an arrangement would be used for a vehicle mainly operated using the power-collecting system, where the ICE can be used for charging the storage battery.

A power converter connected directly to the high voltage power-collecting system, as indicated in the above examples, requires all electric power to pass through the power converter. This incurs conversion losses and generates heat that requires cooling, which reduces the overall system efficiency and increases the demand on the vehicle cooling system. A power converter of this type would also be relatively large and expensive.

It is desirable to solve the above described problems and to provide a hybrid vehicle with a power collector and an operation system that can reduce the cost of manufacturing the vehicle. It is also desirable to provide a hybrid vehicle with an improved overall system efficiency and which incurs lower conversion losses and heat generation.

In the subsequent text the term "electric road system" or ERS will be used for a network of roads provided with means for supplying electric power to a vehicle. The examples below will be described for a case where the power supply comprises overhead wires. However, the invention is not limited to a conductive power supply, using an overhead electrified wire or track/rail in or adjacent the road surface as in the "Electric roads concept" proposed by Volvo Trucks, but can also use an inductive power supply. The invention will be described in relation to a commercial over the highway truck or tractor, but is equally applicable to off-highway trucks/tractors, buses, construction vehicle or other types of work vehicles.

The subsequent text will also refer to a number of different technical terms and examples of electrical components, which will be defined briefly below.

Voltage regulation is a measure of change in the voltage magnitude between the sending and receiving end of a component, such as a transmission or distribution line. Voltage regulation describes the ability of a system to provide near constant voltage over a wide range of load conditions. The term may refer to a passive property that results in more or less voltage drop under various load conditions, or to the active intervention with devices for the specific purpose of adjusting voltage.

Power conversion is converting electric energy from one form to another, converting between AC and DC, or just changing the voltage or frequency, or some combination of these. In this context, the general term "power converter" is defined as an electrical or electro-mechanical device for converting electrical energy. This could be as a transformer to change the voltage of AC power, but the term also refers to a class of electrical machinery that is used to convert one frequency of alternating current into another frequency. Power conversion systems often incorporate redundancy and voltage regulation. One way of classifying power conversion systems is according to whether the input and output are alternating current (AC) or direct current (DC).

One type of power converter is a DC-to-DC or DC/DC converter, which is an electronic circuit which converts a source of direct current (DC) from one voltage level to another. DC/DC converters employ existing technological designs, where the main topological classes are fixed frequency pulse width modulation (PWM) and variable frequency quasi-resonant zero current switching (ZCS).

PWM can be somewhat simpler in design, but it inherently trades off efficiency against operating frequency, both important parameters for electric vehicles (EV) or hybrids (HEV). High-frequency operation has long been recognized as one of the main keys to achieving high-power density, e.g. smaller magnetics, filters, and capacitors, in switch mode converters. With fixed frequency switch mode converters, however, switching losses increase directly with operating frequency, resulting in the right place which limits achievable power density. Variable-frequency converters overcome the frequency barrier by having each turn-on and turn-off of the switch occur at zero current.

A further difference between fixed frequency and variable frequency DC/DC converters is the noise. Again, an important parameter for EVs/HEVs is noise generated by the switch. The hard switching of the PWM generates more noise than the soft switching of ZCS.

Previously, the primary EV/HEV DC/DC converter application is the conversion from a high voltage battery down to the 12-volt typical car voltage, although higher voltages, such as 42 Volts for power steering, may be required. DC/DC converters used in this application typically have inputs of 250-450 Volts, adjustable outputs of 12.5 to 15.5 Volts, and an output power from 250 W to 3.5 kW. The sizes and weights of available DC/DC converters vary substantially, dependent on the operating frequency, of course, but also to some extent on the inputs and outputs of voltage and power. With conventional topologies, efficiencies are typically mid-80-90%, but the low line efficiencies are likely to be perhaps four or five percentage points lower. As a result, AC-DC and some wide-range DC/DC products need to be derated at the low line.

High-voltage/high-power conversion in vehicles is a preferred solution for EV and HEV applications. The technical challenges for such a converter, many of them interrelated, include size, weight, efficiency, electromagnetic compatibility/electromagnetic interference (EMC/EMI), reliability, high-voltage isolation, heat removal/thermal management, and, cost. In addition, reliable performance in the environments of heat, cold, shock, and vibration of a road vehicle is required.

DC/DC converters for commercial EVs and HEVs require high power density, efficiency, and a scalability that cannot be cost-effectively supported by low frequency, bulk converter designs. While a 2 kW DC/DC converter may be a common design target, high-end vehicles require more power, whereas smaller DC/DC converters with lower power ratings would provide lower cost for entry-level EVs and HEVs. To cope with this range of power needs, a flexible, scalable power system methodology using high-power density, modular converters capable of efficient bus conversion, isolation and voltage regulation will enable greater performance, cost-efficiency and a faster time-to-market.

Modern DC/DC power converters can support efficient high-voltage electric power distribution within vehicles and provide key advantages to the power system designer, including small size, low weight, high power density, high efficiency, design flexibility, and fast response to changing electrical demands. Specifically, DC/DC power converters particularly suited for EV/HEV vehicles include Zero-Voltage Switching (DC/ZVS) DC/DC converters with 95% efficiency at 1 kW/in3 power density; ZVS Buck-Boost regulators with >97% efficiency at 1 kW/in3; and Sine Amplitude Converter™ High Voltage (SAC HV) bus converters with 97% efficiency at 1 kW/in3.

Double clamp zero voltage switching (DC/ZVS) converters have the capability of providing a regulated output from a very wide input range. Adaptive cell power systems involve a multiplicity of converters that are configured in an array to provide wide-range, high-voltage, high-frequency power processing. A converter block typically utilizes two magnetically coupled converter cells that are selectively configured in series or parallel. In either configuration, common-mode noise is essentially cancelled, eliminating a major filtering challenge for EVs and HEVs.

Adaptive cell topologies embodied in DC/ZVS DC/DC converters for EV and HEV DC/DC converter performance may include Sine Amplitude Converter (SAC) cells. SAC engines utilize zero-voltage/zero-current switching to eliminate switching losses. By eliminating switching loss, the SAC can be operated efficiently at relatively high frequencies, typically in the MHz range, resulting in smaller product size. High operating frequency allows for miniaturization of many components, increasing overall converter power density. Soft switching converters operating at high frequency also minimize electromagnetic interference (EMI) and the filtering components required by hard-switching converters operating at low frequency.

The SAC engine is typically used to provide fixed voltage ratio bus conversion with HV isolation. The DC-ZVS engine provides DC/DC conversion with regulation and isolation.

ZVS buck-boost regulators provide a regulated output from an unregulated input source. ZVS buck-boost regulators may be used standalone, as non-isolated voltage regulators, or combined with SAC current multipliers to create isolated DC/DC converters. The regulator may be "factorized" away from SAC current multipliers to provide increased density at the point of load while supporting efficient power distribution and savings in conductor weight and cost. In combination, these engines enable DC/DC converter systems with significantly higher density, flexibility, and efficiency than conventional converters. ZVS buck-boost regulator capabilities include input and output voltages up to at least 650 Vdc and conversion efficiency up to 98%.

A unique soft switching topology and ZVS control architecture enable efficient HV operation at 1 MHz. Regulators may be paralleled to achieve increased output power. A feature of the regulator control architecture is that its switching sequence does not change in either buck or boost mode. Only the relative duration of phases within each operating cycle are controlled to effect voltage step up or step down.

Fixed-ratio converters, which include the SAC HV bus converter, are capable of efficient HV bus conversion. SAC HV bus converter capabilities include input and output voltages up to at least 650 Vdc and conversion efficiency up to 98%.

ZVS-ZCS Sine Amplitude Converter topologies with a low Q power train support efficient high frequency power processing with a fixed-frequency oscillator having a high spectral purity and common-mode symmetry, resulting in essentially noise-free operation. The control architecture locks the operating frequency to the power train resonant frequency, optimizing efficiency and minimizing output impedance. By effectively cancelling reactive components, output impedance, Zout, can be relatively low. To further reduce Zout, or for greater power capability, bus converters can be paralleled with accurate current sharing. Quiet and powerful, SAC bus converters provide essentially linear voltage/current conversion with flat output impedance up to about 1 MHz.

In combination, these solutions are examples of power converters well suited for commercial EVs and HEVs including small size, low weight, very high efficiency, low EMI, high-voltage isolation, heat management, modularity, design flexibility, scalability, and cost. They are easily paralleled to configure fault-tolerant high-power arrays.

Another type of power converter is a DC-to-AC, or DC/AC power converter, often termed inverter. This is an electrical power converter that changes direct current (DC) to alternating current (AC). The converted AC can be at any required voltage and frequency with the use of appropriate transformers, switching, and control circuits. Solid-state inverters have no moving parts and are used in a wide range of applications, from small switching power supplies in computers, to large electric utility high-voltage direct current applications that transport bulk power. Inverters are commonly used to supply AC power from DC sources such as overhead wires or batteries.

A variable-frequency drive (VFD) controls the operating speed of an AC motor by controlling the frequency and voltage of the power supplied to the motor. An inverter provides the controlled power. In most cases, the variable-frequency drive includes a rectifier so that DC power for the inverter can be provided from main AC power. AC power supplied from a motor operated as a generator can also be rectified for charging a battery. Since an inverter is the key component, variable-frequency drives are sometimes called inverter drives or just inverters. VFDs that operate directly from an AC source without first converting it to DC are called cycloconverters. They are now commonly used for driving traction motors.

Adjustable speed motor control inverters are currently used to power the traction motors in some electric and diesel-electric rail vehicles as well as some battery electric vehicles and hybrid electric highway vehicles. Various improvements in inverter technology are being developed specifically for electric vehicle applications. In vehicles with regenerative braking, the inverter also takes power from the motor acting as a generator and stores it in batteries or a similar suitable energy storage system.

According to a preferred embodiment, the invention relates to a hybrid energy system in a vehicle. The hybrid energy system comprises an autonomous power supply and is connectable to an external power supply infrastructure or grid along the route of said vehicle. The vehicle is arranged to operate in an autonomous power supply mode using an on-board energy storage system, in an external power supply mode using electrical power from overhead wires or a roadside rail, or in a combined autonomous and external power supply mode using electrical power from both sources.

According to an aspect of the invention, the hybrid energy system comprises a high voltage propulsion system split into two parts or high voltage circuits inside the vehicle. The hybrid energy system comprises a first high voltage circuit comprising a first traction motor connected to an energy storage system by a first power converter for propelling the vehicle. The hybrid energy system further comprises a second high voltage circuit comprising a second traction motor connectable to an external source of electrical power by a second power converter for propelling the vehicle. The first and the second traction motor can be operated as motors, for propelling the vehicle, or as generators, for regeneration of energy.

The first and the second traction motor can each be mechanically connected to an individual or a common ground engaging element, such as a driven axle provided with a pair of wheels. The mechanical connection can be a direct connection, such as a drive shaft and a differential or a pair of wheel motors, or an indirect connection, such as a driveline including a transmission or gearbox. In the case of a truck, the first and the second traction motor can drive individual first and second driven axles, or one common driven axle. The first and the second traction motor can also be operated as generators.

The first high voltage circuit and the second high voltage circuit are operated at the same or at similar voltages and are connectable by a third power converter which is located as a bridge between the first and the second high voltage circuits and the first and second power converters. In this context, the term "high voltage" refers to a voltage in a preferred range of 500-800 V. For instance, the first high voltage circuit can be operated at 500-700 V and the second high voltage circuit can be operated at 550-800 V.

The first and the second power converters are preferably DC/AC power converters, or inverters, which are arranged to convert the high voltage direct current to alternating current used for driving the first and second traction motors. The first and second traction motors are preferably three-phase AC motors, which can be synchronous and/or asynchronous, where synchronous motors often use permanent magnets (PMSM). For the purpose of the invention, DC motors can also be used, which DC motors can use brushes or be brushless (BLDC).

The third power converter is a DC/DC power converter. This particular arrangement of the DC/DC power converter is advantageous as it allows the size of the DC/DC power converter to be reduced considerably, relative to a conventional positioning of such a power converter. Examples of relative sizes of DC/DC power converter will be given in the subsequent text. The positioning of the DC/DC power converter also allows for a very flexible use and a number of alternative operating modes, each allowing for a more energy efficient operation and reduced energy losses. Examples of such operating modes are given in the text below.

An advantage is that not all the power from the external power supply needs to pass through the bridge. Instead the main part of the electric power can be directly utilized by the vehicle in the second high voltage circuit. Another advantage is that by splitting the high voltage system, the third converter, or bridge converter, does not need to be at full power range of the propulsion system of the hybrid vehicle. This reduces the size and cost of the third converter. The electrical energy storage system of such a hybrid vehicle may be of any suitable technology, including batteries, super-capacitors, fuel cells and flywheels. By using the energy storage system in the hybrid system, it will be possible to further reduce the required size of the feeding converter for the hybrid system.

The autonomous power supply preferably, but not necessarily, comprises an internal combustion engine connected to the first traction motor. The engine can be used for charging the energy storage system, for instance a battery, by operating the first traction motor as a generator, using the first power converter as a rectifier.

The second high voltage circuit is connectable to an external power supply in the form of overhead wires or a rail. The overhead wires can be accessed through a conventional pantograph or similar, mounted at a suitable location on the vehicle. The rail can be a roadside rail adjacent the route followed by the vehicle, or a recessed rail in the road surface. Examples of such solutions can be found in the "Electric roads concept" proposed by Volvo, or in prior art documents such as WO2012/069495 and CN 102275510, which are incorporated by reference.

As indicated above, the first traction motor and the second traction motor can be connected to individual driven axles, or be connected to a common driven axle. Different operating modes are available depending on the selected mechanical connection for the motors.

A controllable switch can be connected in parallel with the third power converter. The switch is arranged to by-pass the third power converter when closed. Operation of the controllable switch is determined by the operating mode selected, which will be described below.

The invention further relates, according to an aspect thereof, to a method for operating a hybrid energy system in a vehicle provided with an autonomous power supply and being connectable to an external power supply infrastructure along the route of said vehicle.

As indicated above the hybrid energy system comprises a first high voltage circuit comprising a first traction motor for propelling the vehicle connected to an energy storage system by a first power converter, and a second high voltage circuit comprising a second traction motor for propelling the vehicle connectable to an external source of electrical power by a second power converter. The first high voltage circuit and the second high voltage circuit are connectable by a third power converter and by a parallel controllable switch between the first and the second power converters.

The method involves operating the hybrid energy system in any one of a number of alternative modes, which operating modes include at least:

an autonomous power supply mode involving operating the first and second traction motor using the energy storage system;

an external power supply mode involving connecting the third power converter and operating one or both of the first and second traction motors using the external source of electrical power; and a combined autonomous and external power supply mode involving operating the first traction motor using the energy storage system and the second traction motor using the external source of electrical power.

In the autonomous power supply mode the energy storage system is used for electric operation of the vehicle, when the external power supply is disconnected. The energy storage system can be used for operating the first traction motor only, using the energy storage system directly via the first power converter.

In the external power supply mode the second traction motor can be connected directly to the external power supply via the second power converter, without losses being incurred in the third power converter. In addition, the external power supply can also be connected to the first traction motor, via the third and the first power converter, order to operate both the first and second traction motors. The energy storage system can be charged from the external power supply during the latter operating mode.

In the combined autonomous and external power supply mode the first traction motor can be operated using the energy storage system via the first power converter, and the second traction motor can be operated using the external source of electrical power, via the first power converter. In this case, the second traction motor can be driven directly by the external power supply, without losses being incurred in the third power converter.

As indicated above, the inventive method allows for a flexible hybrid energy system that can be operated in multiple alternative modes, while minimizing the use of the third power converter. This flexibility is made possible by the location of the third power converter, which is a DC/DC converter. The reduced power requirement for the DC/DC converter allows it to be dimensioned for a relatively small power rating. This in turn allows for a DC/DC converter of smaller size and lower weight, having very high efficiency and reduced heat generation.

According to a further example, the hybrid energy system can be operated in an alternative autonomous power supply mode involving bypassing the third power converter and operating both of the first and second traction motors using the energy storage system. In this example the energy storage system can be used for operating both the first and second traction motor by controlling a switch connected in parallel to bypass the third power converter. The energy storage system can also be used for operating the second traction motor, using the energy storage system directly via the second power converter. In the latter case, the second traction motor can be driven directly by the energy storage system, without losses being incurred in the third power converter. Depending on the design of the vehicle driveline, the first and second traction motors can be used for driving independent first and second driven axles, respectively, or for driving a common driven axle.

According to a further example, the hybrid energy system can be operated in an alternative external power supply mode by bypassing the third power converter. This example involves disconnecting the energy storage system, using existing contactors or circuit breakers connecting the energy storage system to the first high voltage circuit, and operating both the first and second traction motors using the external source of electrical power via their respective power converter. As in the previous example, the first and second traction motors can be used for driving independent first and second driven axles, respectively, or for driving a common driven axle.

Both these alternative operating modes contribute to increased flexibility for the hybrid energy system, by allowing power to be supplied directly to the first and the second traction motor from the on-board energy storage system or the external source of electrical power without incurring losses in the third power converter, which is a DC/DC converter.

The inventive hybrid energy system can also be operated in a number of alternative regenerative operating modes, adding to the flexibility of the system.

According to a further example, the hybrid energy system can be operated in a first alternative regenerative operating mode. In the first alternative regenerative mode the second traction motor is driven using the external source of electrical power to drive a ground engaging element. As described above, the first and the second traction motor can each be mechanically connected to an individual or a common ground engaging element, such as a driven axle provided with a pair of wheels. Accordingly, when the first and the second traction motor are mechanically connected to individual ground engaging elements, the second traction motor can drive the first traction motor indirectly via the ground engaging elements. The second traction motor drives one ground engaging element, whereby a further ground engaging element drives the first traction motor for charging the energy storage system. The first power converter can be used as a rectifier for this purpose.

The first alternative regenerative mode can be used for charging the energy storage system when the third (DC/DC) power converter cannot supply sufficient power for this purpose.

According to a further example, the hybrid energy system can be operated in a second alternative regenerative operating mode. In the second alternative regenerative mode power is supplied to the external source of electrical power by using a controllable switch mounted in parallel to bypass the third power converter and operating one or both of the first and second traction motors as generators using ground engaging elements. As described above, the first and the second traction motor can each be mechanically connected to an individual or a common ground engaging element, such as a driven axle provided with a pair of wheels. The second alternative regenerative mode can be used for braking the vehicle without using the service brakes or when travelling downhill. Kinetic energy is converted to electrical energy by one or both traction motors and is supplied to directly to the external source of electrical power via the respective first and/or second power converters.

The second alternative regenerative mode allows regenerated electrical power to be returned to the grid without using the third (DC/DC) power converter.

According to a further example, the hybrid energy system can be operated in a third alternative regenerative operating mode. In the third alternative regenerative mode power is supplied to the energy storage system by using a controllable switch mounted in parallel to bypass the third (DC/DC) power converter and operating one or both of the first and second traction motors as generators using ground engaging elements. As described above, the first and the second traction motor can each be mechanically connected to an individual or a common ground engaging element, such as a driven axle provided with a pair of wheels. The second alternative regenerative mode can be used for braking the vehicle without using the service brakes or when travelling downhill instead of using compression braking. Kinetic energy is converted to electrical energy by one or both traction motors and is supplied directly to the energy storage system via the respective first and/or second power converters. During this operation, the external power supply must be disconnected.

The third alternative regenerative mode allows regenerated electrical power to be returned to the energy storage system without using the third (DC/DC) power converter.

According to a further example, the hybrid energy system can be operated in a fourth alternative regenerative operating mode. In the fourth alternative regenerative operating mode the second traction motor is driven using the external source of electrical power. When the first and the second traction motor are mechanically connected to a common ground engaging element, the second traction motor can drive the first traction motor directly via a mechanical connection in the transmission for charging the energy storage system. This involves disconnecting both traction motors from the part of the vehicle transmission connecting them to the ground engaging elements. The first traction motor is then driven using the second traction motor to charge the energy storage system.

The fourth alternative regenerative mode can be used for charging the energy storage system when the vehicle is standing still, without using the third (DC/DC) power converter.

The invention further relates, according to an aspect thereof, to a vehicle, preferably but not necessarily a commercial vehicle, comprising a hybrid energy system as described and operated according to the above text.

The present invention also relates to a computer program, computer program product and a storage medium for a computer all to be used with a computer for executing the method as described in any one of the above examples.

A hybrid energy system as described above, comprises two high voltage circuits which are connected by a DC/DC converter and can be operated at different tolerance levels. For instance, in an exemplary system, the nominal voltage in the two electrical circuits can be e.g. 650 V while the actual voltage in a first of the circuits can vary between 500 V and 900 V. If the allowable variation in the second circuit is limited to 550 V to 800 V, then a DC/DC converter can be connected between the two circuits to allow power transfer without running the risk of interference or damage to the system.

Further advantages with the arrangement are that fewer components require to be galvanically isolation from the vehicle chassis. According to the invention it is sufficient to provide galvanic isolation for the DC/DC converter, the second electric motor and its inverter (second power converter). A conventional system, e.g. as described in FIG. 4, would require galvanic isolation for the entire system including the first electric motors and the energy storage system. By providing a power converter in the form of a DC/DC converter connecting the two high voltage circuits the system can be operated in multiple different modes without requiring all electric power to pass through the DC/DC converter. This results in reduced conversion losses and heat generation requiring cooling, which in turn improves the overall system efficiency and reduces the demand on the vehicle cooling system. The power rating of the DC/DC converter can also be reduced, which allows the size of the converter to be reduced and contributes to a more compact installation.

BRIEF DESCRIPTION OF THE DRAWINGS

In the following text, the invention will be described in detail with reference to the attached drawings. These schematic drawings are used for illustration purposes only and do not in any way limit the scope of the invention. In the drawings.

DETAILED DESCRIPTION

Figure 1A:
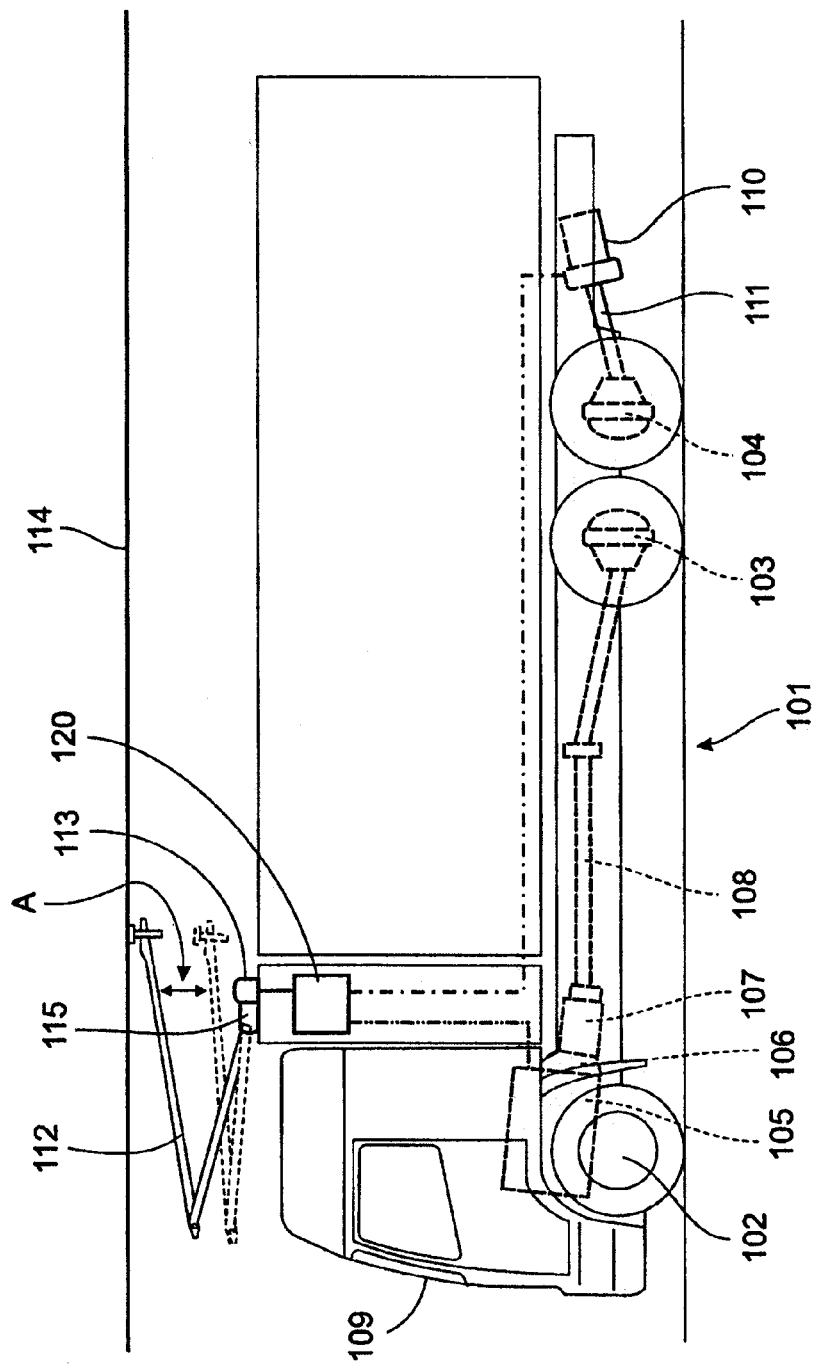
FIG. 1A shows a side view of a hybrid vehicle with a power collector according to one embodiment of the invention.
Figure 1B:
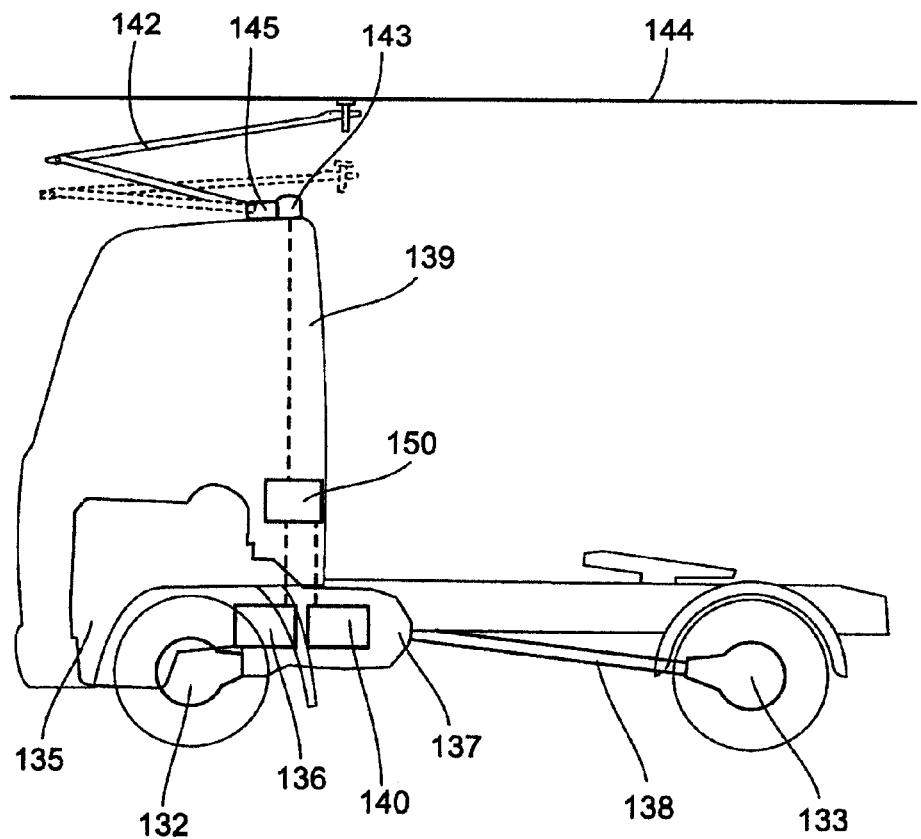
FIG. 1B shows a side view of a hybrid vehicle according to an alternative embodiment of the invention.

FIG. 1A is a side view showing a hybrid vehicle with a power collector according to the present embodiment, and FIG. 1B is a side view showing an alternative hybrid vehicle. As shown in FIGS. 1A-1B, the hybrid vehicle with the power collector is applied to a heavy truck referred to as a "vehicle" in the subsequent text.

FIG. 1A shows a vehicle 101 in the form of a truck with a front axle 102 and two driven first and second rear axles 103, 104. The vehicle 101 is provided with an autonomous power supply comprising an internal combustion engine (ICE) 105 connected to a first electric motor-generator (EM1) 106 and a transmission 107, such as an automated manual transmission (AMT), for transmitting torque to the first rear axle 103 via a first drive shaft 108. A first electric motor-generator (EM) 106, hereafter referred to as the first motor, can be provided with electrical power from an on-board energy storage system, such as a battery, or an external power supply, such as overhead wires. This will be described in further detail below. The engine 105, the first motor 106, the transmission 107 and first drive shaft 108 constitute a first driving force transmission system that transmits rotational driving force of the engine 105 and/or the first motor 106 to the first rear axle 103.

Although the figures describe an example using overhead wires, the inventive concept is also applicable to alternative conductive arrangements, such as roadside rails or tracks, or inductive arrangements located in the road surface.

A second electric motor-generator (EM2) 110 is provided below adjacent the second rear axle 104 and is connected to said axle via a second drive shaft 111. The second motor 106 and the second drive shaft 111 constitute a second driving force transmission system that transmits rotational driving force of the second motor 106 to the second rear axle 104. The second electric motor-generator 110, hereafter referred to as the second motor, can be provided with electrical power from an external power supply, such as overhead wires, and/or an on-board energy storage system, such as a battery (not shown).

To supply electrical power to the first and/or the second motors 106, 110, pantographs 112 (one shown) are provided as power recovery units of a power collector 113 in an upper pan of the vehicle 101. The pantographs 112 can be mounted to the upper part of the vehicle 101 behind a cab 109, as shown in FIG. 1A, or on the cab itself, as shown in FIG. 1B. Electrical power is supplied via the pantographs 112 to the first and/or the second motors 106, 110 from overhead wires 114 disposed above a road. The overhead wires 114 are comprised of a pair of overhead wires (one shown), and the pantographs 112 are also comprised of a pair of pantographs. The pantographs 112 are connected to the overhead wires 114, respectively. Here, it is assumed that direct current (DC) is supplied to the overhead wires 114, and one of the two overhead wires is a power supply line to which direct current is supplied, and the other one acts as an electricity return line. The power collector 113 comprises the pantographs 112 and an actuator 115 for raising and lowering the pantographs 112, as indicated by arrow A. The pantographs 112 are adapted to be driven between an operating position at which they receive electrical power from the overhead wires 114, as indicated by solid lines in FIG. 1A, and a retracted position at which they receive no electrical power as indicated by dash-dotted lines in FIG. 1A.

An engine electronic control unit (not shown) is provided as an internal combustion engine control means for controlling the engine 105, and the transmission 107. A motor electronic control unit (not shown) is provided as a motor control means for controlling the first and the second motors 106, 110, and a power collector electronic control unit (not shown) is provided as a power collector control means for controlling the power collector 113. For overall control, an electronic control unit (ECU; not shown) is provided as an integrated control means for carrying out integrated control of the engine electronic control unit, the engine electronic control unit and the power collector electronic control unit. The electronic control unit is part of an electrical supply system 120 in the vehicle, which system controls and supplies electrical power to and from the first and the second motors 106, 110 and the energy storage system, such as a battery. The electrical supply system 120 is an integral part of the vehicle hybrid energy system and comprises the requisite power electronics for connecting the power collector 113, the first and second motors 106, 110 and the energy storage system. The electrical supply system 120 will be described in further detail below. The engine 105 is preferably a diesel engine, and its fuel injection quantity is electronically controlled by the engine electronic control unit in response to an output request. The transmission 107 is adapted to be an automated manual transmission that is activated by a gear shift actuator (not shown), to select a shift gear to be used. A clutch (not shown) is adapted to be engaged and disengaged by a clutch actuator (not shown). These actuators are electronically controlled by the engine electronic control unit in response to a gear shift request, so that the clutch is engaged and disengaged, and shift gears are changed. The arrangement and operation of a transmission of this type in a hybrid vehicle is well known and will not be described in further detail.

The first and the second motors 106, 110 are preferably three-phase alternating current (AC) motors, and their rotational state is electronically controlled by the motor electronic control unit in response to an output request. It should be noted that the first and second motors 106, 110 can carry out both regenerative operation, as generators, and normal powering operation, as traction motors. The motor electronic control unit has a function (a regeneration control means) for carrying out regenerative control of the motors 106, 110 so that regenerative energy is stored as electric energy in a battery (or other power storage means), for instance during braking or during downhill travel. Electrical power stored in a battery or similar can be used for operation of at least the first motor 106, for example, when the power collector 13 is not operated for collecting power. Different operating modes will be described in detail below.

The ECU, as the integrated control means, can set a vehicle driving mode and carries out integrated control of the engine electronic control unit, the motor electronic control unit, and the power collector electronic control unit based on information from roads, GPS information, and so on received via a transmitting and receiving unit, output requests (including braking requests) from an accelerator pedal and a brake pedal, not shown, and selection information from a selection switch (a driving mode selection means; not shown) that allows selection of a driving mode. The main vehicle driving modes are an external power supply mode in which the vehicle is driven by only rotational driving force from at least one motor, and an autonomous power supply mode in which the vehicle is driven by the rotational driving force from the engine and/or at least one motor using the power storage means. The selection switch allows a driver to select either of these driving modes, and also allows selection of an automatic selection mode in which a driving mode is automatically selected by the ECU.

When the automatic selection mode is selected using the selection switch, the ECU can act as a driving mode selection means. In a situation where the road is equipped with overhead wires 114, and the vehicle 101 is running in a driving lane equipped with overhead wires 114 and can collect power from the overhead wires 114, the external power supply mode is primarily selected. In a case where electrical power is especially needed in a situation where electrical power can be collected from the overhead wires 114, a combined driving mode is automatically selected. In a situation where electrical power cannot be collected from the overhead wires 114, the autonomous power supply mode is primarily selected. The ECU can also select a combined driving mode in which the vehicle is driven by a combination of rotational driving force from at least one motor and rotational driving force from the engines.

Whether or not electrical power is collectable from the overhead wires 114 can be determined using a sensor, such as a camera, which is disposed in the vicinity of the pantographs 112 and detects the presence of the overhead wires 114. When detection information is obtained from the sensor, it is determined that electrical power can be collected from the overhead wires 114, and when detection information is not obtained from the sensor, it is determined that electrical power cannot be collected from the overhead wires 114. The ECU can be provided with a vehicle position determination means for determining whether or not the pantographs 112 are in a position where they can receive electrical power from the overhead wires 114. The ECU also has an overhead wire determination means for determining whether or not the overhead wires 114 are disposed in the lane in which the vehicle 101 is running based on information from roads and GPS information inputted to the ECU. When the overhead wire determination means determines that the overhead wires 114 are discontinued in the lane in which the vehicle 101 is currently running in the external power supply mode using at least one motor (the external power supply mode or the combined driving mode), the ECU automatically switches to the autonomous power supply mode irrespective of which driving mode is selected by the selection switch before the vehicle 101 enters the area where the overhead wires 114 are not provided. When the vehicle position determination means determines that the pantographs 2 are at positions where they can receive electrical power from the overhead wires 114, the above procedure is carried out in reverse. In a case where an internal combustion engine driving mode, not using the motors, is selected, the engine is started if the engine is at a standstill, and the actuator 115 is controlled to set the pantographs 112 in the retracted position so as to inhibit them from collecting electrical power.

FIG. 1B shows a vehicle 131 in the form of a truck with a front axle 132 and one driven rear axle 133. As in FIG. 1A, the vehicle 131 is provided with an autonomous power supply comprising an internal combustion engine (ICE) 135 connected to a first electric motor-generator (E1) 136 and a transmission 137, such as an automated manual transmission (AMT), for transmitting torque to the rear axle 133 via a drive shaft 138. The first electric motor-generator (EM) 136, hereafter referred to as the motor, can be provided with electrical power from an on-board energy storage system, such as a battery, or an external power supply, such as overhead wires. This will be described in further detail below. The engine 135, the motor 136, the transmission 137 and drive shaft 138 constitute a first driving force transmission system that transmits rotational driving force of the engine 135 and/or the first motor 136 to the rear axle 133. A second electric motor-generator (EM2) 140 is provided for driving the drive shaft 138 after the transmission 137.

Alternatively, the second motor can be arranged below adjacent the rear axle 133 and be connected to said axle via a second drive shaft, similar to the solution shown in FIG. 1A. The second electric motor-generator 136 constitutes a second driving force transmission system that transmits rotational driving force of the second electric motor-generator 136 to the rear axle 133. The second electric motor-generator 140, hereafter referred to as the second motor, can be provided with electrical power from an external power supply, such as overhead wires, and/or an on-board energy storage system, such as a battery (not shown). To supply electrical power to the first and/or the second motors 136, 140, pantographs 142 (one shown) are provided as power recovery units of a power collector 43 in an upper part of the vehicle 131. The pantographs 142 can be mounted to the upper part of the vehicle 131 behind a cab 139, as shown in FIG. 1A, or on the cab itself, as shown in FIG. 1B. Electrical power is supplied via the pantographs 142 to the first and/or the second motors 136, 140 from overhead wires 144 disposed above a road. The overhead wires 144 are comprised of a pair of overhead wires (one shown), and the pantographs 142 are also comprised of a pair of pantographs. The pantographs 142 are connected to the overhead wires 144, respectively. It is assumed that direct current (DC) is supplied to the overhead wires 144, and one of the two overhead wires is a power supply line to which direct current is supplied, and the other one acts as an electricity return line. The power collector 143 comprises the pantographs 142 and an actuator 145 for raising and lowering the pantographs 142. The pantographs 142 are adapted to be driven between an operating position at which they receive electrical power from the overhead wires 144, as indicated by solid lines in FIG. 1B, and a retracted position at which they receive no electrical power as indicated by dash-dotted lines in FIG. 1B.

The vehicle 31 in FIG. 1B is provided with an engine electronic control unit (not shown) as an internal combustion engine control means for controlling the engine 135, and the transmission 137. A motor electronic control unit (not shown) is provided as a motor control means for controlling the first and the second motors 136, 140, and a power collector electronic control unit (not shown) is provided as a power collector control means for controlling the power collector 143. For overall control, an electronic control unit (ECU; not shown) is provided as an integrated control means for carrying out integrated control of the engine electronic control unit, the engine electronic control unit and the power collector electronic control unit. The electronic control unit is part of an electrical supply system 150 in the vehicle, which system controls and supplies electrical power to and from the first and the second motors 136, 140 and the energy storage system, such as a battery. The electrical supply system 150 is an integral part of the vehicle hybrid energy system and comprises the requisite power electronics for connecting the power collector 143, the first and second motors 136, 140 and the energy storage system. Operation of the hybrid energy system is carried out in the same way as for the system described for FIG. 1A above, with the difference that both motors are arranged to drive the same rear axle 133.

Figure 2A:
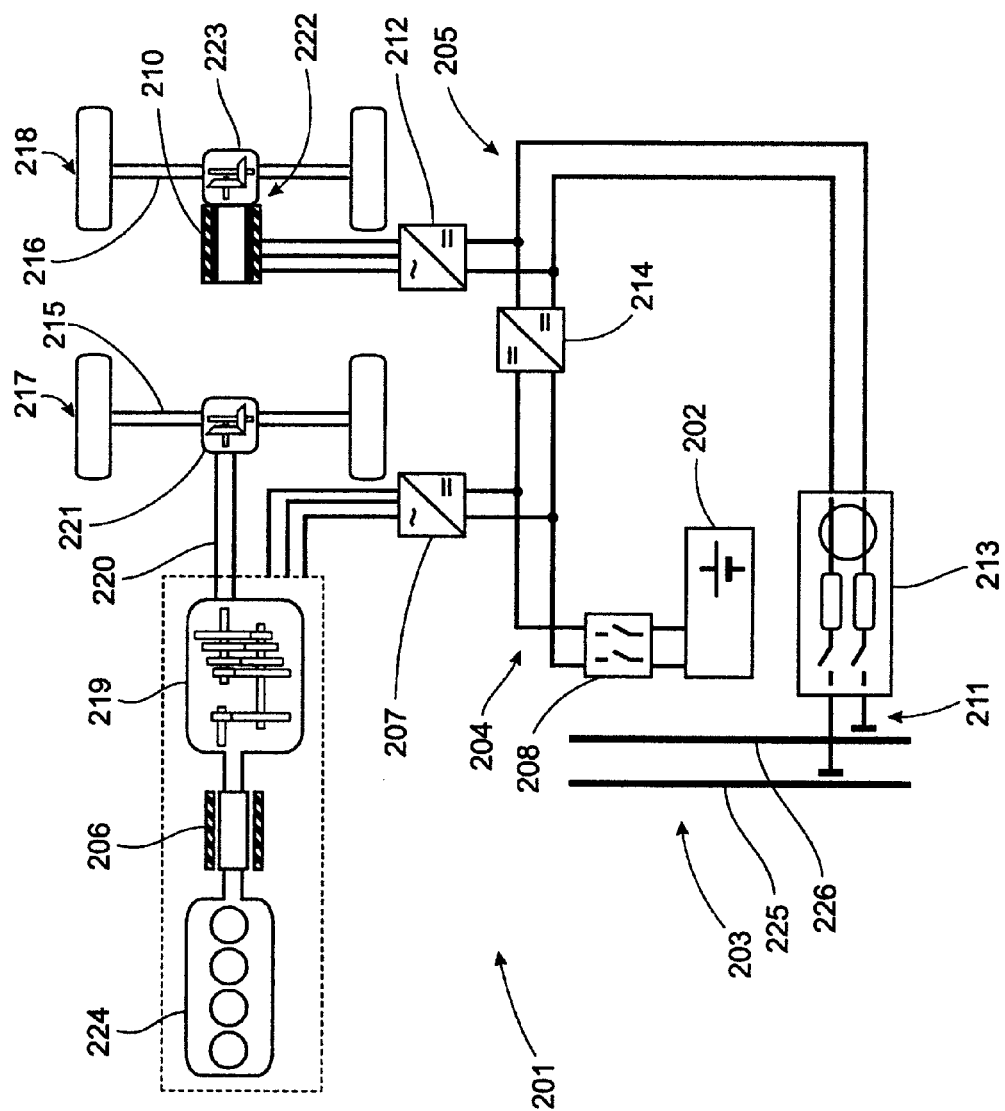
FIG. 2A shows a schematic diagram of an energy system according to a first example.

FIG. 2A shows a schematic diagram of a vehicle 201 with a hybrid energy system according to a first example. In this example, the hybrid energy system comprises an autonomous power supply and is connectable to an external power supply infrastructure or grid along the route of said vehicle. The vehicle 201 is arranged to operate in an autonomous power supply mode using an on-board energy storage system 202, in an external power supply mode using electrical power from overhead wires 203, or in a combined autonomous and external power supply mode using electrical power from both sources. The electrical energy storage system in this hybrid vehicle comprises batteries, but any suitable technology can be used, such as super-capacitors, fuel cells and flywheels.

The hybrid energy system in FIG. 2A comprises a high voltage propulsion system split into two parts or high voltage circuits 204, 205 inside the vehicle 201. The first high voltage circuit 204 comprises a first traction motor 206 connected to an energy storage system by a first power converter 207 for propelling the vehicle. In this case, the energy storage system is a battery 202 which is connected to the first high voltage system by conventional relays and contactors 208, allowing the battery 202 to be connected and disconnected from the system. The second high voltage circuit 205 comprises a second traction motor 210 connectable to the external source of electrical power 203 by a power collector 211 which is directly connected to a second power converter 212 for propelling the vehicle. The power collector 211 is connected to the second high voltage circuit 205 by conventional relays and contactors 213, allowing the power collector 211 to be connected and disconnected from the system. The first and second power converters 207, 212 are DC/AC converters for converting the DC high voltage in the respective high voltage circuit 204, 205 to an AC voltage for driving the first and second AC motor. The first and second traction motors are three-phase AC motors. The first and the second traction motor 206, 210 can be operated as motors, for propelling the vehicle, or as generators, for regeneration of energy. When the motors are operated in generator mode, the respective first and second power converter is operated as a rectifier.

The first and the second traction motor 206, 210 are each mechanically connected to individual first and second driven axles 215, 216, each provided with a pair of wheels 217, 218. The first traction motor 206 is indirectly connected to the first driven axle 215 via a driveline including an automated manual transmission 219, a first drive shaft 220 and a differential 221. The second traction motor 210 is directly connected to the second driven axle 216 via a second drive shaft 222 and a differential 223. This driveline layout is schematically shown in FIG. 1A. Alternatively, the second axle can be provided with a pair of wheel motors.

The first high voltage circuit 204 and the second high voltage circuit 205 are operated at the same or at similar voltages and are connectable by a third power converter 214 which is located as a bridge between the first and the second high voltage circuits 204, 205 and the first and second DC/AC converters 207, 212. The third power converter 214 is a DC/DC power converter. In this context, the term "high voltage" refers to a voltage in a preferred range of 500-800 V. For instance, the first high voltage circuit can be operated at 500-700 V and the second high voltage circuit can be operated at 550-800 V.

An advantage is that not all the power from the external power supply needs to pass through the bridge. Instead the main part of the electric power can be directly utilized by the vehicle in the second high voltage circuit. By using the energy storage system in the hybrid system, it will be possible to reduce the required size of the DC/DC converter. Another advantage is that by splitting the high voltage system, the third converter, or DC/DC converter, does not need to be at full power range of the propulsion system of the hybrid vehicle. This further reduces the size and cost of the third converter. For example, in a system according to the invention the continuous rating of the DC/DC converter can be 50-100 kW, as compared to a conventional system. In a conventional system with a DC/DC converter handling all electrical power from an external power supply the continuous rating of can be 150-300 kW depending on the system layout. The positioning of the DC/DC power converter also allows for a very flexible use and a number of alternative operating modes, each allowing for a more energy efficient operation and reduced energy losses. Examples of such operating modes are given in the text below.

The autonomous power supply further comprises an internal combustion engine 224 connected to the first traction motor 206 via a clutch (not shown). The engine 224 can be used for driving the first driven axle via the driveline or for charging the energy storage system 202 by operating the first traction motor 206 as a generator, using the first power converter 207 as a rectifier.

The second high voltage circuit 205 is connectable to the external power supply 203, in this case in the form of overhead wires 225, 226. The overhead wires 225, 226 can be accessed through a conventional pantograph, mounted at a suitable location on the vehicle (see FIGS. 1A and 1B). Direct current (DC) is supplied to the overhead wires 225, 226, and one of the two overhead wires is a power supply line to which direct current is supplied, and the other one acts as an electricity return line. Alternatively, a roadside rail adjacent the route followed by the vehicle, or a recessed rail in the road surface can be used.

Figure 2B:
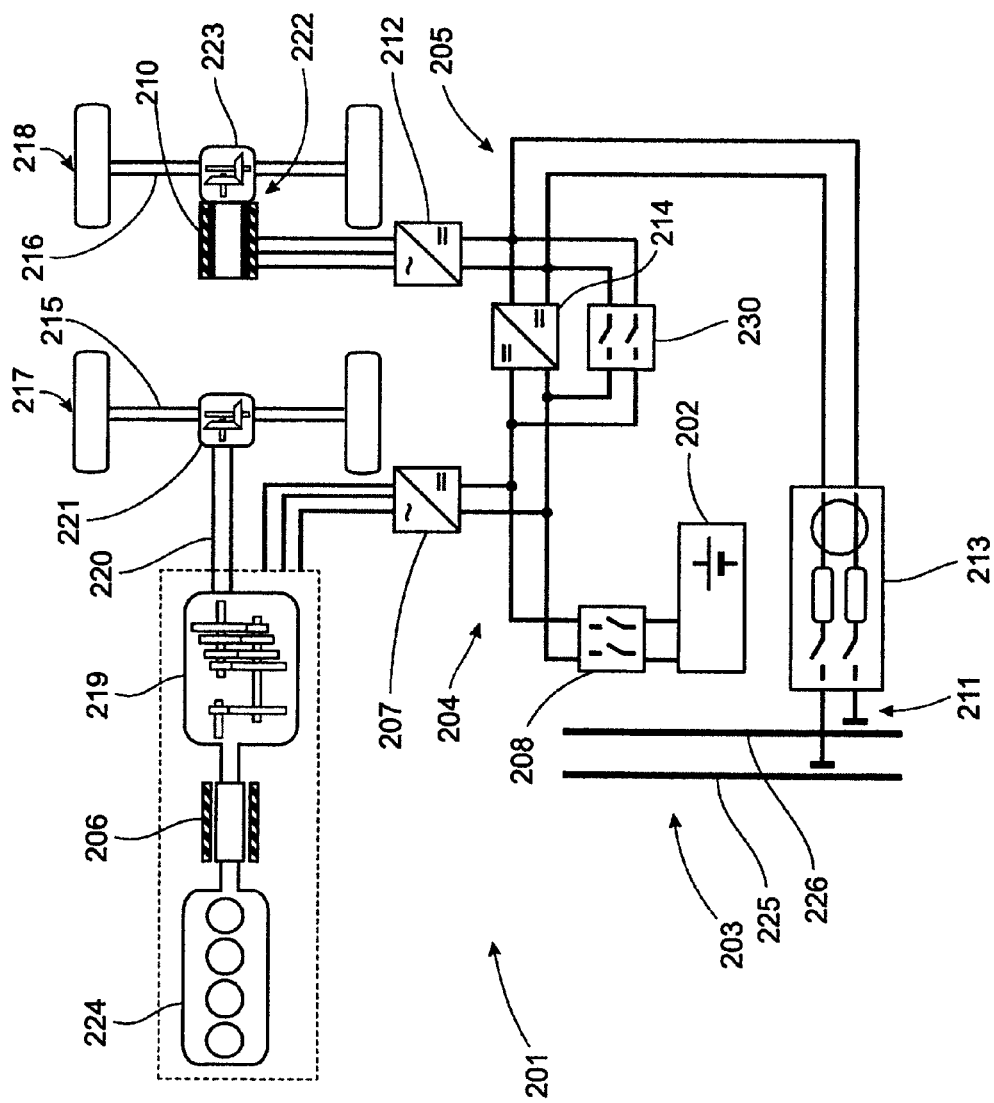
FIG. 2B shows a schematic diagram of an energy system according to a second example.

FIG. 2B shows a schematic diagram of a vehicle with a hybrid energy system according to a second example. The system shown in FIG. 2B is basically identical to that of FIG. 2A, wherein the same reference numerals have been used for identical components. The system in FIG. 2B differs in that a controllable switch 230 is connected in parallel with the third power converter 214. The switch 230 is arranged to by-pass the third power converter 214 when closed, allowing additional operating modes to be used. The by-pass creates a direct connection between the first and second high voltage circuits 204, 205, whereby losses in the DC/DC converter can be avoided. Operation of the controllable switch 230 is determined by the operating mode selected, which modes will be described below.

Figure 3A:
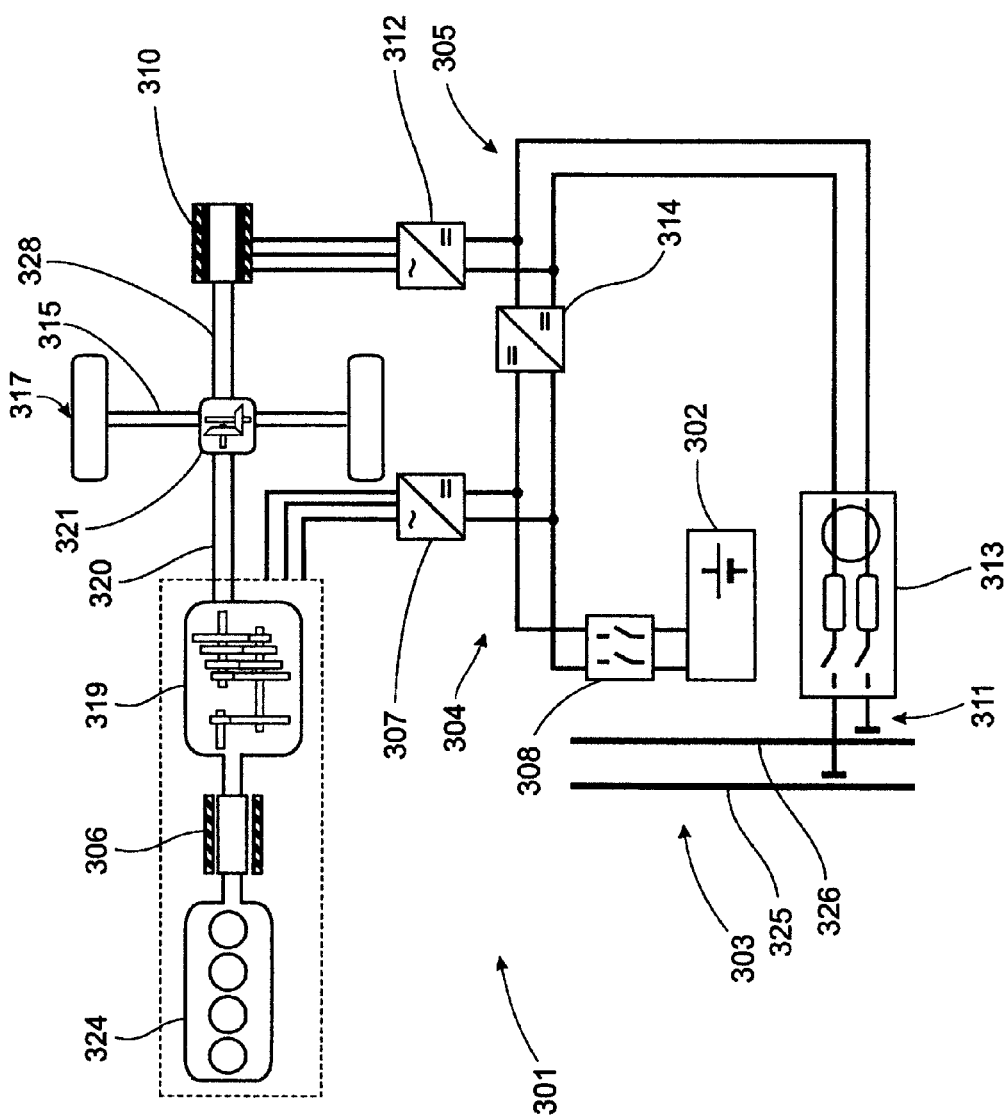
FIG. 3A shows a schematic diagram of an energy system according to a third example.

FIG. 3A shows a schematic diagram of a vehicle 301 with a hybrid energy system according to a third example. In this example, the hybrid energy system comprises an autonomous power supply and is connectable to an external power supply infrastructure or grid along the route of said vehicle. The vehicle 301 is arranged to operate in an autonomous power supply mode using an on-board energy storage system 302, in an external power supply mode using electrical power from overhead wires 303, or in a combined autonomous and external power supply mode using electrical power from both sources. The electrical energy storage system in this hybrid vehicle comprises batteries, but any suitable technology can be used, such as super-capacitors, fuel cells and flywheels.

The hybrid energy system in FIG. 3A comprises a high voltage propulsion system split into two parts or high voltage circuits 304, 305 inside the vehicle 301. The first high voltage circuit 304 comprises a first traction motor 306 connected to an energy storage system by a first power converter 307 for propelling the vehicle. In this case, the energy storage system is a battery 302 which is connected to the first high voltage system by conventional relays and contactors 308, allowing the battery 302 to be connected and disconnected from the system. The second high voltage circuit 305 comprises a second traction motor 310 connectable to the external source of electrical power 303 by a power collector 311 which is directly connected to a second power converter 312 for propelling the vehicle. The power collector 311 is connected to the second high voltage circuit 305 by conventional relays and contactors 313, allowing the power collector 311 to be connected and disconnected from the system. The first and second power converters 307, 312 are DC/AC converters for converting the DC high voltage in the respective high voltage circuit 304, 305 to an AC voltage for driving the first and second AC motor. The first and second traction motors are three-phase AC motors. The first and the second traction motor 306, 310 can be operated as motors, for propelling the vehicle, or as generators, for regeneration of energy. When the motors are operated in generator mode, the respective first and second power converter is operated as a rectifier.

The first and the second traction motor 306, 310 are each mechanically connected to a common first driven axle 315, provided with a pair of wheels 317. The first traction motor 306 is indirectly connected to the first driven axle 315 via a driveline including an automated manual transmission 319, a first drive shaft 320 and a differential 321. The second traction motor 310 is directly connected to the first driven axle 315 via a second drive shaft 328 and the common differential 321. This driveline layout is schematically shown in FIG. 1B.

The first high voltage circuit 304 and the second high voltage circuit 305 are operated at the same or at similar voltages and are connectable by a third power converter 314 which is located as a bridge between the first and the second high voltage circuits 304, 305 and the first and second DC/AC converters 307, 312. The third power converter 314 is a DC/DC power converter. In this context, the term "high voltage" refers to a voltage in a preferred range of 500-800 V. For instance, the first high voltage circuit can be operated at 500-700 V and the second high voltage circuit can be operated at 550-800 V.

As indicated above, it is an advantage is that not all the power from the external power supply needs to pass through the bridge. Instead the main part of the electric power can be directly utilized by the vehicle in the second high voltage circuit. By using the energy storage system in the hybrid system, it will be possible to reduce the required size of the DC/DC converter. Another advantage is that by splitting the high voltage system, the third converter, or DC/DC converter, does not need to be at full power range of the propulsion system of the hybrid vehicle. This further reduces the size and cost of the third converter. For example, in a system according to the invention the continuous rating of the DC/DC converter can be 50-100 kW, as compared to a conventional system. In a conventional system with a DC/DC converter handling all electrical power from an external power supply the continuous rating of can be 100-300 kW depending on the system layout. The positioning of the DC/DC power converter also allows for a very flexible use and a number of alternative operating modes, each allowing for a more energy efficient operation and reduced energy losses. Examples of such operating modes are given in the text below.

The autonomous power supply further comprises an internal combustion engine 324 connected to the first traction motor 306 via a clutch (not shown). The engine 324 can be used for driving the first driven axle 315 via the driveline or for charging the energy storage system 302 by operating the first traction motor 306 as a generator, using the first power converter 307 as a rectifier.

The second high voltage circuit 305 is connectable to the external power supply 303, in this case in the form of overhead wires 325, 326. The overhead wires 325, 326 can be accessed through a conventional pantograph, mounted at a suitable location on the vehicle (see FIGS. 1A and 1B). Direct current (DC) is supplied to the overhead wires 325, 326, and one of the two overhead wires is a power supply line to which direct current is supplied, and the other one acts as an electricity return line. Alternatively, a roadside rail adjacent the route followed by the vehicle, or a recessed rail in the road surface can be used.

Figure 3B:
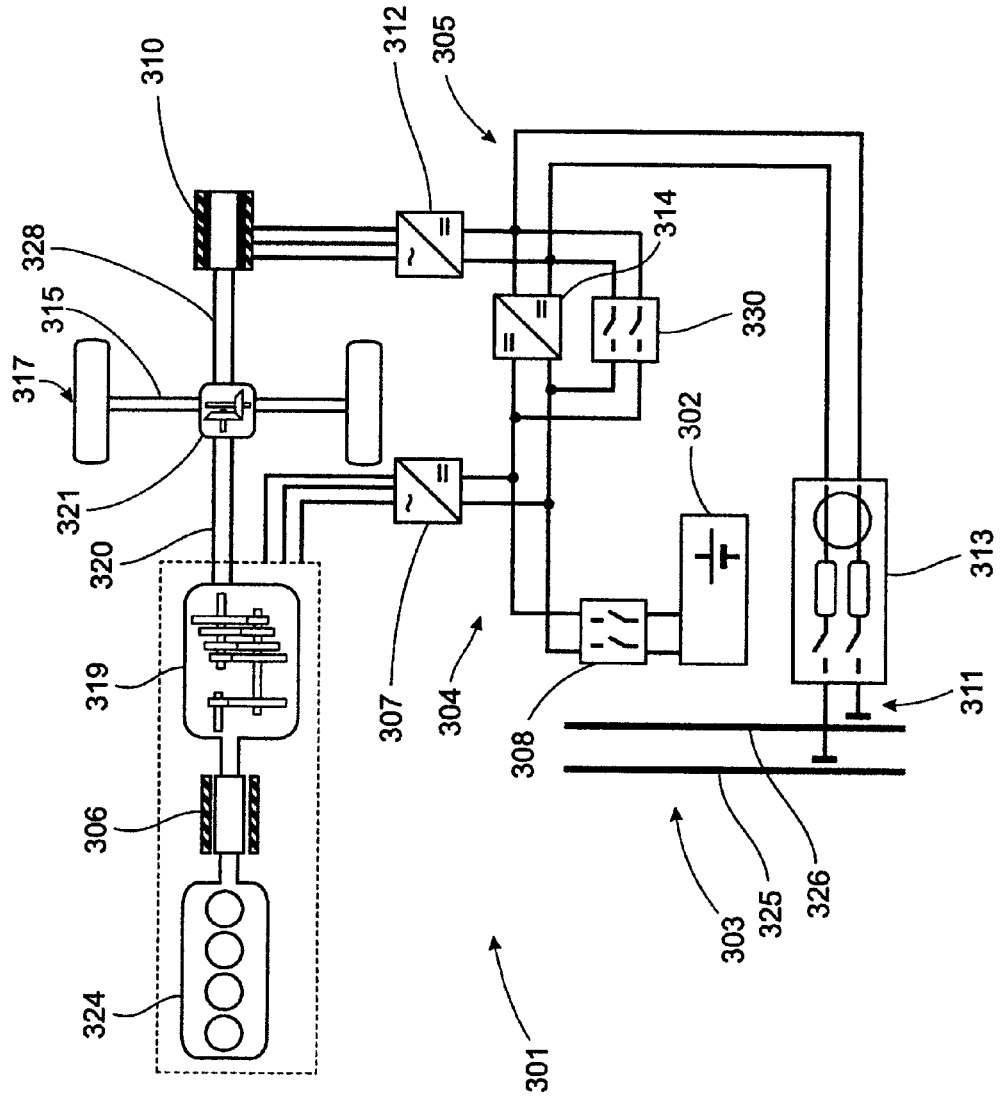
FIG. 3B shows a schematic diagram of an energy system according to a fourth example.

FIG. 3B shows a schematic diagram of a vehicle with a hybrid energy system according to a fourth example. The system shown in FIG. 3B is basically identical to that of FIG. 3A, wherein the same reference numerals have been used for identical components. The system in FIG. 3B differs in that a controllable switch 330 is connected in parallel with the third power converter 314. The switch 330 is arranged to by-pass the third power converter 314 when closed, allowing additional operating modes to be used. The by-pass creates a direct connection between the first and second high voltage circuits 304, 305, whereby losses in the DC/DC converter can be avoided. Operation of the controllable switch 330 is determined by the operating mode selected, which modes will be described below.

Figure 3C:
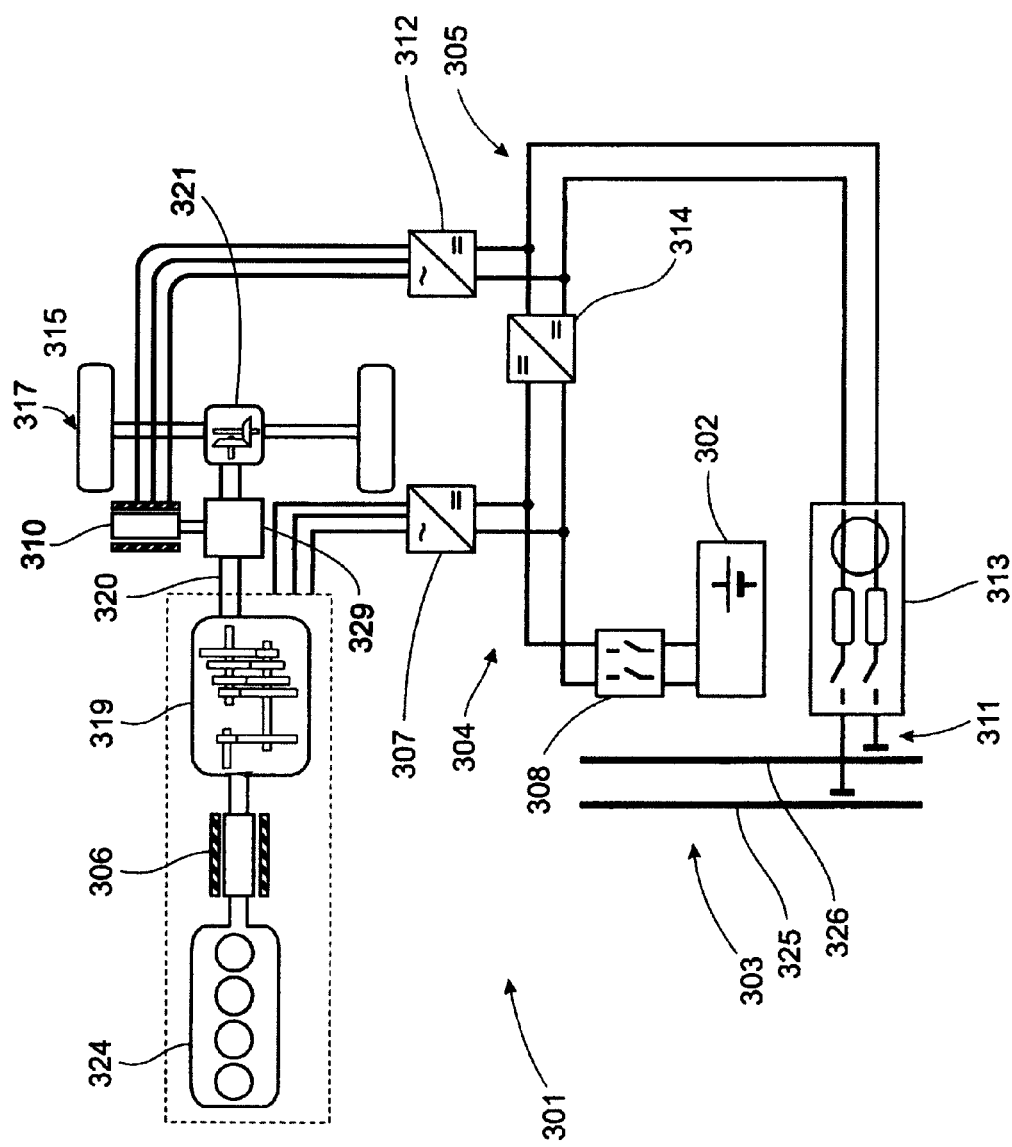
FIG. 3C shows a schematic diagram of an energy system according to a fifth example.

FIG. 3C shows a schematic diagram of a vehicle with a hybrid energy system according to a fifth example. The system shown in FIG. 3C is basically identical to that of FIG. 3A, wherein the same reference numerals have been used for identical components. The system in FIG. 3C differs in that a second traction motor 310 is connected directly to the first driven axle 315 by a power take-off transmission 329. In this way the second traction motor is
connected both to the first driven axle 315, via the first drive shaft 320 and the common differential 321, and to the first traction motor 306, via the transmission 319.

The arrangement in FIG. 3C can be used for charging the energy storage system 302 by operating the first traction motor 306 as a generator when the vehicle is standing still. The second traction motor 310 is then operated using the external power supply 303. In this mode, the second traction motor 310 drives the first traction motor 306 via the first drive shaft 320, the transmission 319 through a suitable gear set. The power take-off transmission 329 also allows the second traction motor 310 to assist the first traction motor 306 and/or the internal combustion engine 324, if required.

The above hybrid energy systems are provided with an autonomous power supply and can be connected to an external power supply infrastructure along the route of a vehicle 201, 301. As indicated in FIGS. 1A-1B and 2A-2B, the hybrid energy systems comprise a first high voltage circuit 204, 304 comprising a first traction motor 206, 306 for propelling the vehicle connected to an energy storage system 202, 302 by a first DC/AC converter 207, 307, and a second high voltage circuit 212, 312 comprising a second traction motor 210, 310 for propelling the vehicle connectable to an external source of electrical power 203, 303 by a second DC/AC converter 212, 312. The first high voltage circuit and the second high voltage circuit 204, 304; 205, 305 are connectable by a DC/DC converter 214, 314.

Optionally a parallel controllable switch 230, 330 is provided between the first and the second DC/AC converters 207, 307; 212, 312, by-passing the DC/DC converter 214, 314.

The invention involves operating the hybrid energy system in any one of a number of alternative modes, which operating modes include at least:
- an autonomous power supply mode involving operating the first traction motor 207 using the energy storage system 202;
- an external power supply mode involving connecting the DC/DC converter 214, 314 and operating one or both of the first and second traction motors 206, 306; 210, 310 using the external source of electrical power 203, 303; and
- a combined autonomous and external power supply mode involving operating the first traction motor 206, 306 using the energy storage system 202, 302 and the second traction motor using 210, 310 the external source of electrical power 203, 303.

In the autonomous power supply mode the energy storage system 202, 302 is used for electric operation of the vehicle, when the external power supply 203, 303 is disconnected. The energy storage system 202, 302 can be used for operating the first traction motor 206, 306 only, using the energy storage system 202, 302 directly via the first DC/AC converter 207, 307.

In the external power supply mode the second traction motor 210, 310 can be connected directly to the external power supply 203, 303 via the second DC/AC converter 212, 312, without losses being incurred in the DC/DC converter 214, 314. In addition, the external power supply 203, 303 can also be connected to the first traction motor 206, 306, via the DC/DC 214, 314 converter and the first DC/AC converter 207, 307, order to operate both the first and second traction motors 206, 306; 210, 310. The energy storage system 202, 302 can be charged from the external power supply 203, 303 during the latter operating mode.

In the combined autonomous and external power supply mode the first traction motor 206, 306 can be operated using the energy storage system 202, 302 via the first DC/AC converter 207, 307, and the second traction motor 210, 310 can be operated using the external power supply 203, 303, via the first DC/AC converter 207, 307. In this case, the second traction motor 210, 310 can be driven directly by the external power supply 203, 303, without losses being incurred in the DC/DC converter 214, 314.

As indicated above, the invention allows for a flexible hybrid energy system that can be operated in multiple alternative modes, while minimizing the use of the DC/DC converter 214, 314. The three basic modes described above can be carried out by any one of the examples shown in FIGS. 1A-B and 2A-2B. This flexibility is made possible by the location of the DC/DC converter 214, 314. The reduced power requirement for the DC/DC converter allows it to be dimensioned for a relatively small power rating. This in turn allows for a DC/DC converter of smaller size and lower weight, having very high efficiency and reduced heat generation.

According to an additional example, the hybrid energy system can be operated in an alternative autonomous power supply mode involving bypassing the DC/DC converter 214, 314 and operating both of the first and second traction motors 206, 306; 210, 310 using the energy storage system 202, 302. In this example the energy storage system 202, 302 can be used for operating both the first and second traction motor by controlling a switch 230, 330 connected in parallel to bypass the DC/DC converter 214, 314. The energy storage system 202, 302 can also be used for operating the second traction motor 210, 310, using the energy storage system 202, 302 directly via the second DC/AC converter 212, 312. In the latter case, the second traction motor 210, 310 can be driven directly by the energy storage system 202, 302, without losses being incurred in the DC/DC converter 214, 314. Depending on the design of the vehicle driveline, the first and second traction motors 206, 306; 210, 310 can be used for driving independent first and second driven axles 215, 216; 315, 316, respectively (FIG. 2B), or for driving a common driven axle 315 (FIG. 3B).

According to a further additional example, the hybrid energy system can be operated in an alternative external power supply mode by bypassing the DC/IC converter 214, 314. This example involves disconnecting the energy storage system 202, 302, using existing contactors 208, 308 connecting the energy storage system 202, 302 to the first high voltage circuit, and operating both the first and second traction motors 206, 306; 210, 310 using the external power supply 203, 303 via their respective power converter 207, 212; 307, 312. As in the previous example, the first and second traction motors 206, 306; 210, 310 can be used for driving independent first and second driven axles 215, 216; 315, 316, respectively (FIG. 2B), or for driving a common driven axle 35 (FIG. 3B).

Both these alternative operating modes contribute to increased flexibility for the hybrid energy system, by allowing power to be supplied directly to the first and the second traction motor 206, 306; 210, 310 from the on-board energy storage system 202, 302 or the external power supply 203, 303 without incurring losses in the DC/DC converter 214, 314. The alternative modes described above can be carried out by any one of the examples shown in FIGS. 2B and 3B, where a controllable switch 230, 330 is provided for by-passing the DC/DC converter.

The inventive hybrid energy system can also be operated in a number of alternative regenerative operating modes, adding to the flexibility of the system.

According to a further example, the hybrid energy system can be operated in a first alternative regenerative operating mode. In the first alternative regenerative mode the second traction motor 210, 310 is driven using the external power supply 203, 303 to drive a ground engaging element. As described above, the first and the second traction motor 206, 306; 210, 310 can each be mechanically connected to an individual or a common ground engaging element, such as a driven axle 215, 216 provided with a pair of wheels 217, 218.

Accordingly, when the first and the second traction motor 206, 306; 210, 310 are mechanically connected to individual ground engaging elements, the second traction motor 210, 310 can drive the first traction motor 206, 306 indirectly via the ground engaging elements. The second traction motor 210, 310 drives one ground engaging element, whereby a further ground engaging element drives the first traction motor 206, 306 for charging the energy storage system 202, 302. The first DC/AC converter 207, 307 can be used as a rectifier for this purpose.

The first alternative regenerative mode can be used for charging the energy storage system 202, 302 when the DC/DC converter 214, 314 cannot supply sufficient power for this purpose. This first regenerative mode described above can be carried out by any one of the examples shown in FIGS. 2A and 2B, where two individual axles 215, 216 are provided. According to a further example, the hybrid energy system can be operated in a second alternative regenerative operating mode. In the second alternative regenerative mode power is supplied to the external power supply 203, 303 by using a controllable switch 230, 330 mounted in parallel to bypass the DC/DC converter 214, 314 and operating one or both of the first and second traction motors 206, 306; 210, 310 as generators using ground engaging elements. As described above, the first and the second traction motor 206, 306; 210, 310 can each be mechanically connected to an individual or a common ground engaging element, such as a driven axle 215, 216; 315 provided with a pair of wheels 217, 218; 317. The second alternative regenerative mode can be used for braking the vehicle without using the service brakes or when travelling downhill instead of using compression braking. Kinetic energy is converted to electrical energy by one or both traction motors 206, 210; 306, 310 and is supplied to directly to the external power supply 203, 303 via the respective first and/or second power converters.

The second alternative regenerative mode allows regenerated electrical power to be returned to the grid without using the DC/DC converter 214, 314. This second alternative regenerative mode can be carried out by any one of the examples shown in FIGS. 2B and 3B, where a controllable switch 230, 330 is provided for by-passing the DC/DC converter 214, 314.

According to a further example, the hybrid energy system can be operated in a third alternative regenerative operating mode. In the third alternative regenerative mode power is supplied to the energy storage system 202, 302 by using a controllable switch 230, 330 mounted in parallel to bypass the DC/DC converter 214, 314 and operating one or both of the first and second traction motors 206, 306; 210, 310 as generators using ground engaging elements. As described above, the first and the second traction motor 206, 306; 210, 310 can each be mechanically connected to an individual or a common ground engaging element, such as a driven axle 215, 216; 315 provided with a pair of wheels 217, 218; 317. The second alternative regenerative mode can be used for braking the vehicle without using the service brakes or when travelling downhill instead of using compression braking. Kinetic energy is converted to electrical energy by one or both traction motors 206, 210; 306, 310 and is supplied to directly to the energy storage system 202, 302 via the respective first and/or second power converters. During this operation, the external power supply 203, 303 must be disconnected.

The third alternative regenerative mode allows regenerated electrical power to be returned to the energy storage system 202, 302 without using the DC/DC converter 214, 314. This second alternative regenerative mode can be carried out by any one of the examples shown in FIGS. 2B and 3B, where a controllable switch 230, 330 is provided for by-passing the DC/DC converter 214, 314.

According to a further example, the hybrid energy system can be operated in a fourth alternative regenerative operating mode. In the fourth alternative regenerative operating mode the second traction motor 210, 310 is driven using the external power supply 203, 303. When the first and the second traction motor 206, 306; 210, 310 are mechanically connected to a common ground engaging element, the second traction motor 210, 310 can drive the first traction motor 206, 306 directly via a mechanical connection in the transmission for charging the energy storage system 202, 302. This involves disconnecting both traction motors from the part of the vehicle transmission connecting them to the ground engaging elements. The first traction motor 206, 306 is then driven using the second traction motor to charge the energy storage system 202, 302.

The fourth alternative regenerative mode can be used for charging the energy storage system 202, 302 when the vehicle is standing still, without using the DC/DC converter 214, 314. This fourth regenerative mode described above can be carried out by any one of the examples shown in FIGS. 3A and 3B, where a common axle 315 is provided.

The fifth alternative regenerative mode is also used for charging the energy storage system 202, 302 when the vehicle is standing still, without using the DC/DC converter 214, 314. This fifth regenerative mode described above can be carried out by the example shown in FIG. 3C, where both traction motors 306, 310 are connected to the first drive shaft. This arrangement is advantageous under urban operating conditions where the vehicle frequently stopped at bus stops, traffic lights or in queues.

Figure 4:
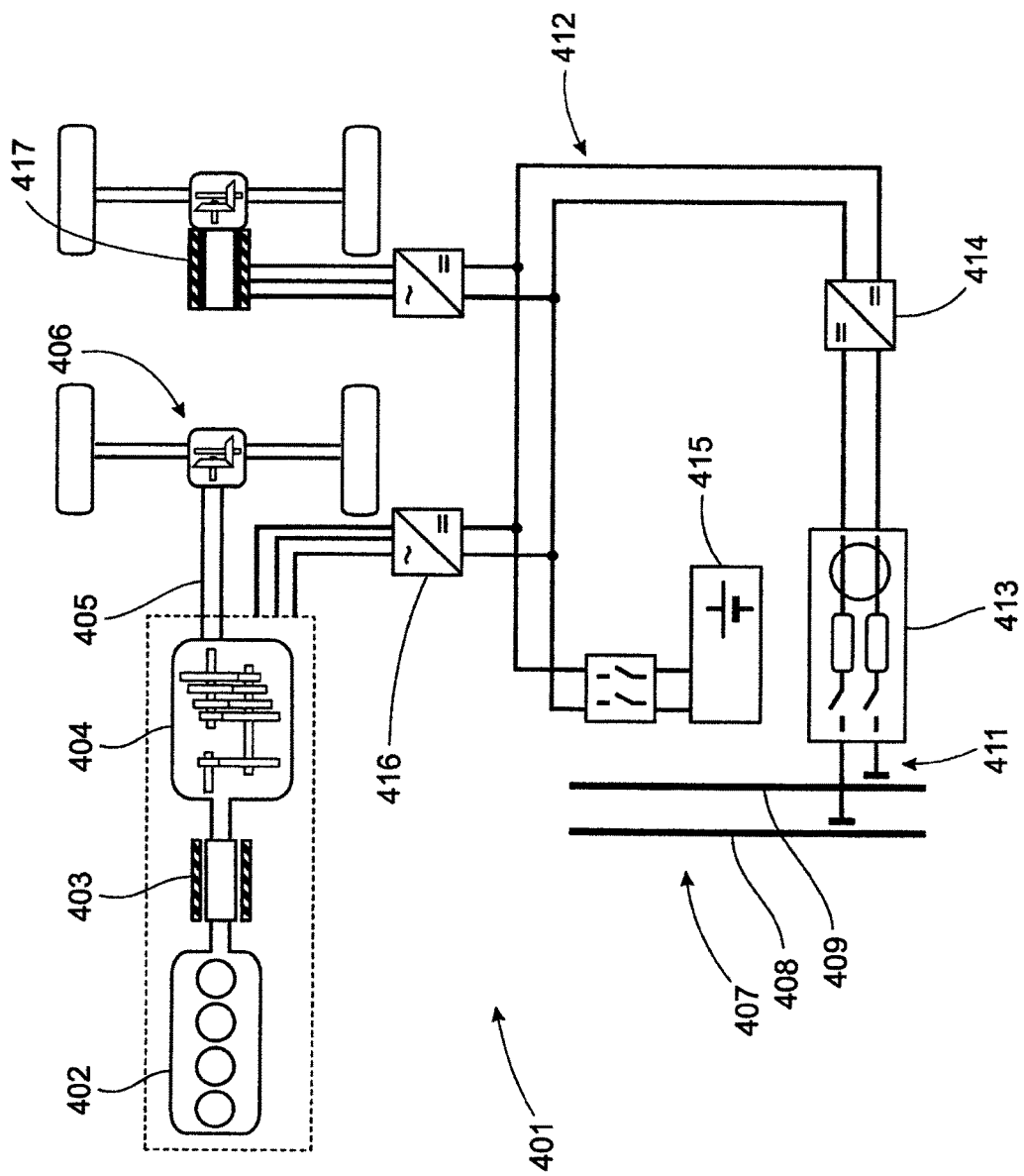
FIG. 4 shows a schematic diagram of a conventional hybrid energy system.

FIG. 4 shows a schematic diagram of a vehicle 401 comprising a conventional hybrid energy system. The vehicle 401 has a hybrid driveline with an autonomous power supply comprising an internal combustion engine 402, a first traction motor 403, a transmission 404 and a drive shaft 405 for driving a first driven axle 406. An external power supply 407 provides electrical power from overhead wires 408, 409 connectable to a power collector 411 connected to a high voltage circuit 412 by conventional relays and contactors 413 and a DC/DC converter 414. The first traction motor 403 can be driven by the high voltage circuit 412 by a battery 45 or the external power supply 407 connected to the motor 403 via a first DC/AC converter 416. A second traction motor 417 can be driven by the high voltage circuit 412 by the battery 415 or the external power supply 407 connected to the motor 417 via a second DC/AC converter 418.

For a hybrid vehicle of this type, provided with a storage battery, the power converter must be dimensioned for a continuous rating equal to the average power requirement of the propulsion system. For a commercial vehicle such as a truck, similar to those shown in FIGS. 1A-1B, the continuous rating would be at least 100-150 kW. Such an arrangement would be used for a vehicle mainly operated using the power-collecting system, where the engine can be used for charging the storage battery. For a similar arrangement not provided with a storage battery, the DC/DC converter must be dimensioned for a continuous rating equal to the peak power requirement of the propulsion system, that is, at least 200-300 kW. In a high voltage circuit 412 connected directly to the high voltage power-collecting system 407, as shown in FIG. 4, all power from the external power supply 407 must pass through the DC/DC converter 414. This incurs conversion losses and generates heat that requires cooling, which reduces the overall system efficiency and increases the demand on the vehicle cooling system. A power converter of this type would also be relatively large and expensive.

The present invention also relates to a computer program, computer program product and a storage medium for a computer all to be used with a computer for executing the method as described in any one of the above examples.

Figure 5:
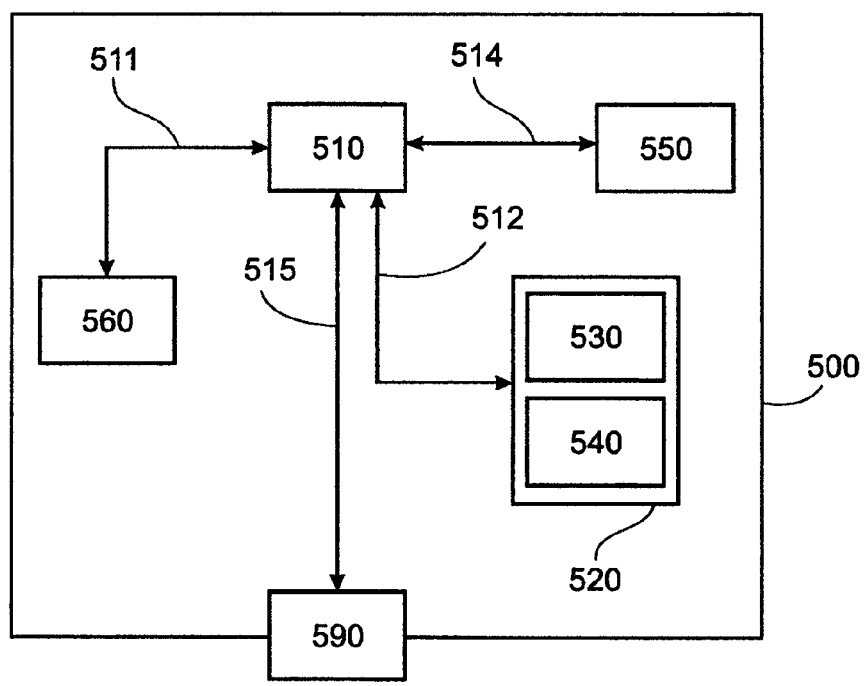
FIG. 5 shows the invention applied on a computer arrangement.

FIG. 5 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for controlling the target gear selection function according to the invention is stored. In an alternative embodiment, the program for controlling the transmission is stored in a separate nonvolatile storage medium 550 for data, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile storage medium 550.

The data-processing unit 510 is tailored for communication with the storage memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515. The method according to the present invention can be executed by the data-processing unit 510, by the data-processing unit 510 running the program stored in the memory 540 or the program stored in the nonvolatile storage medium 550.

The invention as described solves the above problems and has several advantages over conventional hybrid electric vehicle systems, for instance:

i. The average power required to power the vehicle can be drawn from the external power supply and applied directly, without a DC-DC converter loss by the machine or machines connected directly to the external power supply.

ii. Recuperated braking energy may be stored in, or drawn from the energy layer directly, without the DC-DC converter efficiency loss, by the machine or machines connected to the vehicle electrical circuits.

iii. With the energy layer dimensioned with respect to both power and energy requirement over a mission, the power required to be transferred from the external power supply to the vehicle electrical circuits is a minimum of the losses incurred in the cycling of brake energy plus the auxiliary loads. This level of power could be transferred from the external power supply to the vehicle electrical circuits by either a much smaller DC-DC converter than in conventional systems or in an extreme case, by increasing the power rating of the machines directly connected to the external power supply, and recuperating the power by the other electrical machines. In this way galvanically isolated power transfer can occur from the external power supply to the vehicle electrical circuits via the road without the addition of a DC-DC converter, albeit at a small penalty in efficiency.

iv. An additional benefit of adding a separate electrical propulsion instead of utilizing a larger electrical motor in a conventional hybrid drivetrain, is that vehicle manufacturer can use same platform of this part of the original hybrid system, for applications that are designed for an external power supply or not. For an external power supply such as an ERS (Electric Road System) it will be required with an electrical separation of the high voltage components and its surrounding, and traditionally also an impedance monitor will be added to the external power supply voltage system, in order to verify that external power supply components are properly isolated from the vehicle chassis. It is much less complicated, and of less cost, to add (and monitor) such an isolation, to the few extra components for the external power supply application requires, instead of adding isolation costs of the hybrid system, which would be the base of the 1st high voltage circuit. As external power supply application(s) will initially be of smaller volumes, it is better and more efficient to add extra isolation costs to the external power supply components, instead of adding cost to a platform design, which is traditionally used in many other products.

The invention should not be deemed to be limited to the embodiments described above, but rather a number of further variants and modifications are conceivable within the scope of the following patent claims.

The invention claimed is:

1. Hybrid energy system in a vehicle comprising an autonomous power supply and being connectable to an external power supply infrastructure along the route of the vehicle, and which vehicle is arranged to operate in an autonomous power supply mode and/or in an external power supply mode, wherein the system comprises a first high voltage circuit comprising a first traction motor connected to an energy storage system by a first power converter for propelling the vehicle; a second high voltage circuit comprising a second traction motor connectable to an external power supply by a second power converter for propelling the vehicle; and where the first high voltage circuit and the second high voltage circuit are connectable by a third power converter between the first and the second power converters, wherein a controllable switch is connected in parallel with the third power converter, and that the switch is arranged to by-pass the third power converter when closed.

2. Hybrid energy system according to claim 1, wherein the first and the second power converters are DC/AC power converters.

3. Hybrid energy system according to claim 1, wherein the third power converter is a DC/DC power converter.

4. Hybrid energy system according to claim 1, wherein the energy storage system is a high voltage battery.

5. Hybrid energy system according to claim 1, wherein the autonomous power supply comprises an internal combustion engine connected to the first traction motor.

6. Hybrid energy system according to claim 1, wherein the second high voltage circuit is connectable to an external power supply in the form of overhead wires or a rail.

7. Hybrid energy system according to claim 1, wherein the first traction motor and the second traction motor are connected to individual driven axles.

8. Hybrid energy system according to claim 1, wherein the first traction motor and the second traction motor are connected to one driven axle.

9. Method for operating hybrid energy system in a vehicle comprising;
an autonomous power supply and being connectable to an external power supply infrastructure along the route of the vehicle;
a first high voltage circuit comprising a first traction motor for propelling the vehicle connected to an energy storage system by a first power converter (207; 307);
a second high voltage circuit comprising a second traction motor for propelling the vehicle connectable to an external power supply by a second power converter;
and where the first high voltage circuit and the second high voltage circuit are connectable by a third power converter and by a parallel controllable switch between the first and the second power converters, the method comprising
- operating the hybrid energy system in alternative modes, comprising at least:
- an autonomous power supply mode involves operating the first traction motor using the energy storage system;
- an external power supply mode involves connecting the third power converter and operating one or both of the first and second traction motors using the external power supply; and
- a combined autonomous and external power supply mode involves operating the first traction motor using the energy storage system and the second traction motor using the external power supply.

10. Method according to claim 9, comprising operating the hybrid energy system in an alternative autonomous power supply mode involving bypassing the third power converter and operating both of the first and second traction motors using the energy storage system.

11. Method according to claim 9, comprising operating the hybrid energy system in an alternative external power supply mode by bypassing the third power converter, disconnecting the energy storage system and operating both the first and second traction motors using the external power supply.

12. Method according to claim 9, comprising operating the hybrid energy system in a regenerative mode where the second traction motor is driven using the external power supply to drive a ground engaging element, and driving the first traction motor using a further ground engaging element for charging the energy storage system.

13. Method according to claim 9, comprising operating the hybrid energy system in a regenerative mode where power is supplied to the external power supply by bypassing the third power converter and operating one or both of the first and second traction motors using ground engaging elements.

14. Method according to claim 9, comprising operating the hybrid energy system in a regenerative mode where power is supplied to the energy storage system by disconnecting the external power supply and bypassing the third power converter and operating one or both of the first and second traction motors using ground engaging elements.

15. Method according to claim 9, comprising operating the hybrid energy system in an external power supply mode by connecting the first and second traction motors and disconnecting them from the vehicle driveline, and driving the first traction motor using the second traction motor to charge the energy storage system.

16. Vehicle Wherein the vehicle is a commercial vehicle comprising a hybrid energy system according to claim 1.

17. A computer comprising program code for performing all the steps of claim 9 when the program is run on the computer.

18. A computer program product comprising program code stored on a computer readable medium for performing all steps of claim 9 when the program product is run on a computer.

19. A non-transitory storage medium for use in a computing environment co comprising a computer readable program code to perform the method of claim 9.

* * * * *